United States Patent
Shim et al.

(10) Patent No.: US 9,466,846 B2
(45) Date of Patent: Oct. 11, 2016

(54) FUEL CELL SYSTEM AND HUMIDIFICATION DEVICE OF THE SAME

(75) Inventors: Hyo Sub Shim, Gyeonggi-do (KR); Se Joon Im, Gyeonggi-do (KR); HyunJae Lee, Seoul (KR); Deukkuen Ahn, Gyeonggi-do (KR); Jong Hyun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 838 days.

(21) Appl. No.: 13/533,262

(22) Filed: Jun. 26, 2012

(65) Prior Publication Data

US 2013/0130135 A1    May 23, 2013

(30) Foreign Application Priority Data

Nov. 23, 2011    (KR) .......................... 10-2011-0123216

(51) Int. Cl.
    *H01M 8/04*        (2016.01)
    *H01M 8/06*        (2016.01)
    *H01M 8/02*        (2016.01)

(52) U.S. Cl.
CPC ..... *H01M 8/04141* (2013.01); *H01M 8/04164* (2013.01); *H01M 8/04179* (2013.01); *Y02E 60/50* (2013.01)

(58) Field of Classification Search
USPC ................................................ 429/400–535
See application file for complete search history.

(56) References Cited

U.S. PATENT DOCUMENTS

2011/0048837 A1*   3/2011   Kwon ............... H01M 8/04097
                                                                  180/309

FOREIGN PATENT DOCUMENTS

| CN | 1790794 A | 6/2006 |
|---|---|---|
| CN | 2011-46217 Y | 11/2008 |
| KR | 10-2009-0106295 A | 10/2009 |
| KR | 10-2009-0111241 A | 10/2009 |
| KR | 10-2010-0025026 A | 3/2010 |
| KR | 10-2011-0023352 A | 3/2011 |

* cited by examiner

*Primary Examiner* — Basia Ridley
*Assistant Examiner* — Caitlin Wilmot
(74) *Attorney, Agent, or Firm* — Mintz Levin Cohn Ferris Glovsky and Popeo, P.C.; Peter F. Corless

(57) ABSTRACT

A fuel cell system is disclosed. More specifically, the fuel cell system may include a stack that includes an electrical generation assembly of a fuel cell, an air supply unit that supplies air to a cathode of the fuel cell, a humidifier that humidifies exhaust air that is exhausted from the cathode and supply air that is supplied from the air supply unit, a hydrogen supply unit that supplies the anode of the fuel cell with hydrogen, and a water trap that traps condensate that is generated by the anode and exhausts it. In particular, the supply air is supplied to an upstream side of the humidifier and the condensate that is trapped in the water trap is supplied to an upstream side of the humidifier.

4 Claims, 4 Drawing Sheets

FUEL CELL SYSTEM AND HUMIDIFICATION DEVICE OF THE SAME

CROSS-REFERENCE TO RELATED APPLICATION

This application claims priority to and the benefit of Korean Patent Application No. 10-2011-0123216 filed in the Korean Intellectual Property Office on Nov. 23, 2011, the entire contents of which are incorporated herein by reference.

BACKGROUND OF THE INVENTION (a) Field of the Invention

An exemplary embodiment of the present invention relates to a fuel cell system. More particularly, the present invention relates to a fuel cell system and an operating method thereof that improves performance of a fuel cell stack.

(b) Description of the Related Art

A fuel cell system is a kind of electrical generation system converts the chemical energy from a fuel into electricity through a chemical reaction with oxygen or another oxidizing agent. Typically, hydrogen is the most common fuel, but hydrocarbons such as natural gas and alcohols like methanol are sometimes used as alternative fuels.

A fuel cell system typically includes a stack which includes a plurality of individual fuel cells forming an electrical generation assembly, each having a cathode and an anode that allow charges to move between the two sides of the fuel cell. The fuel cell system also includes an air supply device for supplying the cathode of the fuel cell with air, and a hydrogen supply device for supplying the anode of the fuel cell with hydrogen. Here, high temperature and humid air can be exhausted from the cathode of a fuel cell, and high temperature and dry air can be exhausted therefrom during a high power operation. Further, no reacted hydrogen having moisture should be exhausted from the anode of the fuel cell.

Also, the fuel cell system includes a humidifier that humidifies air that is supplied from the air supply device with the air that is exhausted from the cathode of the fuel cell. Accordingly, the humidifier humidifies the air supplied from the air supply device with the air exhausted from the cathode of the fuel cell to supply the humidified air to the cathode.

However, conventionally, the supply air is humidified by the air that is exhausted from the cathode of the fuel cell through a membrane and the humidified air is then supplied to the cathode, and therefore the humidification effect of the fuel cell may in some instances be insufficient.

Furthermore, another problem with conventional fuel cell systems is that when the fuel cell system is started, the fuel cell system accelerates the degradation of a catalyst layer by an OCV (open circuit voltage) which decreases the durability of the system. As a solution to this problem, when the system is started, a separate hydrogen purge device is used to purge the fuel cell with hydrogen. However, the addition of a purge system, not only makes the system complicated but expensive as well.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a fuel cell system and an operating method thereof capable of purging a fuel cell with hydrogen when the system may be started with a simple structure and improving humidification performance of the fuel cell during normal operation of the system.

A fuel cell system according to an exemplary embodiment of the present invention may include a stack that includes an electrical generation assembly of a fuel cell, an air supply unit that supplies air to a cathode of the fuel cell, a humidifier that humidifies exhaust air that is exhausted from the cathode and supply air that may be supplied from the air supply unit, a hydrogen supply unit that supplies the anode of the fuel cell with hydrogen, and a water trap that traps condensate that may be generated by the anode and exhausts the condensate. The supply air may be supplied to an upstream side of the humidifier and the condensate that may be trapped in the water trap may be supplied to an upstream side of the humidifier. The hydrogen that may be supplied by the hydrogen supply unit may be supplied to the anode and the hydrogen that may be exhausted from the anode may be supplied to an upstream side of the humidifier through the water trap.

In some exemplary embodiments of the present invention, a hydrogen purge of the fuel cell may be performed by supplying hydrogen to the cathode through the humidifier.

Also the condensate may be injected at an upstream side of the humidifier, and the water trap may be connected to the humidifier through a condensate exhaust line and a drain valve may be disposed on the condensate exhaust line. The drain valve may be operated by a control signal that may be generated by a controller. The condensate that may be exhausted through the condensate exhaust line may be injected by pressure of the supply air at an upstream side of the humidifier.

An injection portion may be disposed at an end portion of the condensate exhaust line to inject condensate at an upstream side of the humidifier. The humidifier may use the exhaust gas and condensate to humidify the supply air, and the humidified air may be supplied to the cathode.

The fuel cell system may further include a condensate exhaust line that supplies the humidifier with the condensate that may be trapped in the water trap, an exhaust air supply line that supplies exhaust air that may be exhausted from the cathode to the humidifier, and a humidification air supply line that supplies the humidified air to the cathode.

When the fuel cell system is started, hydrogen supplied from the hydrogen supply unit may be supplied to the anode, the hydrogen exhausted from the anode and may be trapped in the water trap may be supplied to the humidifier through the condensate exhaust line, and the hydrogen passing through the humidifier may be supplied to the cathode through the humidification air supply line to perform hydrogen purging of the fuel cell.

A fuel cell system according to an exemplary embodiment of the present invention may include a stack that includes an electrical generation assembly for fuel cells, an air supply unit that supplies a cathode of a fuel cell with air, a humidifier that humidifies exhaust air exhausted from the cathode and supply air supplied by the air supply unit, a hydrogen supply unit that supplies the anode of the fuel cell with hydrogen, and a water trap that traps condensate that may be generated in the anode and exhausts the condensate. When the fuel cell system is started, hydrogen supplied by the hydrogen supply unit may be supplied to the anode, the hydrogen exhausted from the anode and trapped in the water trap may be supplied to the humidifier through the condensate exhaust line, and the hydrogen passing through the humidifier may be supplied to the cathode through the humidification air supply line to perform hydrogen purging of the fuel cell.

A fuel cell system according to an exemplary embodiment of the present invention may include a fuel cell including a cathode and an anode, an air supply unit that supplies the cathode with air, a humidifier that humidifies exhaust air exhausted from the cathode and supply air supplied by the air supply unit, a hydrogen supply unit that supplies the anode of the fuel cell with hydrogen, and a water trap that may trap condensate that is generated in the anode and exhaust the condensate. More specifically, when the fuel cell system is started, hydrogen supplied by the hydrogen supply unit may be supplied to the anode, the hydrogen exhausted from the anode and trapped in the water trap may be supplied to the humidifier through the condensate exhaust line, and the hydrogen passing through the humidifier may be supplied to the cathode through the humidification air supply line to perform hydrogen purging of the fuel cell. The supply air may be supplied to an upstream side of the humidifier and the condensate that is trapped in the water trap may be supplied to the upstream side of the humidifier.

When the fuel cell system is started, a route that connects the water trap with the humidifier may be used as a hydrogen purge route of the fuel cell, and when the fuel cell system is normally operated, a route that connects the water trap with the humidifier may be used as a humidification route of the fuel cell.

A driving method of a fuel cell system that includes a stack that includes an electrical generation assembly of fuel cells, an air supply unit that supplies a cathode of a fuel cell with air, a humidifier that humidifies exhaust air exhausted from the cathode and supply air supplied by the air supply unit, a hydrogen supply unit the anode of the fuel cell with hydrogen, and a water trap that traps condensate that is generated in the anode and exhausts it, may include opening a drain valve of a condensate exhaust line that connects the water trap with the humidifier when the system is in a starting mode, supplying the anode with hydrogen from the hydrogen supply unit, supplying the humidifier with hydrogen that is exhausted from the anode through the water trap, and supplying the cathode with hydrogen through the humidifier to purge the fuel cell with hydrogen.

More specifically, the hydrogen may be supplied to an upstream side of the humidifier through the condensate exhaust line, and the air supply unit may be turned off when the fuel cell system is started.

While the system is being normally operated, the air supply unit may be operated in a condition that the drain valve is opened, supply air that is supplied by the air supply unit may be supplied to an upstream side of the humidifier, and the condensate that is trapped in the water trap may be supplied to an upstream side of the humidifier through the condensate exhaust line. The humidifier may, accordingly, humidify the exhaust air and the supply air, and the humidified air may then be supplied to the cathode of the fuel cell.

When the system is started in an exemplary embodiment of the present invention, a route connecting the water trap with the humidifier is used to purge the fuel cell with hydrogen, and when the system is normally operated, a route connecting the water trap with the humidifier is used to supply an upstream side of the humidifier with condensate that is trapped in the water trap such that the fuel cell is humidified. Accordingly, when the system is started in an exemplary embodiment of the present invention, the fuel cell is purged by hydrogen through a route that connects the water trap with the humidifier so that the OCV formation time is delayed and the OCV convergence value is reduced due to an oxygen inflow delay of the fuel cell. Thereby, the catalyst degradation speed of the fuel cell is delayed in an exemplary embodiment of the present invention and the durability of the stack can be increased.

Also, when the system is normally operated in an exemplary embodiment of the present invention, the condensate that is trapped in the water trap may be supplied to an upstream side of the humidifier through a route connecting the water trap with the humidifier to humidify the fuel cell such that the humidification performance of the fuel cell can be increased.

Further, when the system is started in an exemplary embodiment of the present invention, it is not necessary to provide a separate structure for purging the fuel cell with hydrogen. Instead, a humidification route connecting the water trap with the humidifier is used to purge the fuel cell with hydrogen, so that the entire system can be simplified and as a result reduces costs.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings.

DESCRIPTION OF SYMBOLS

Figure 1:
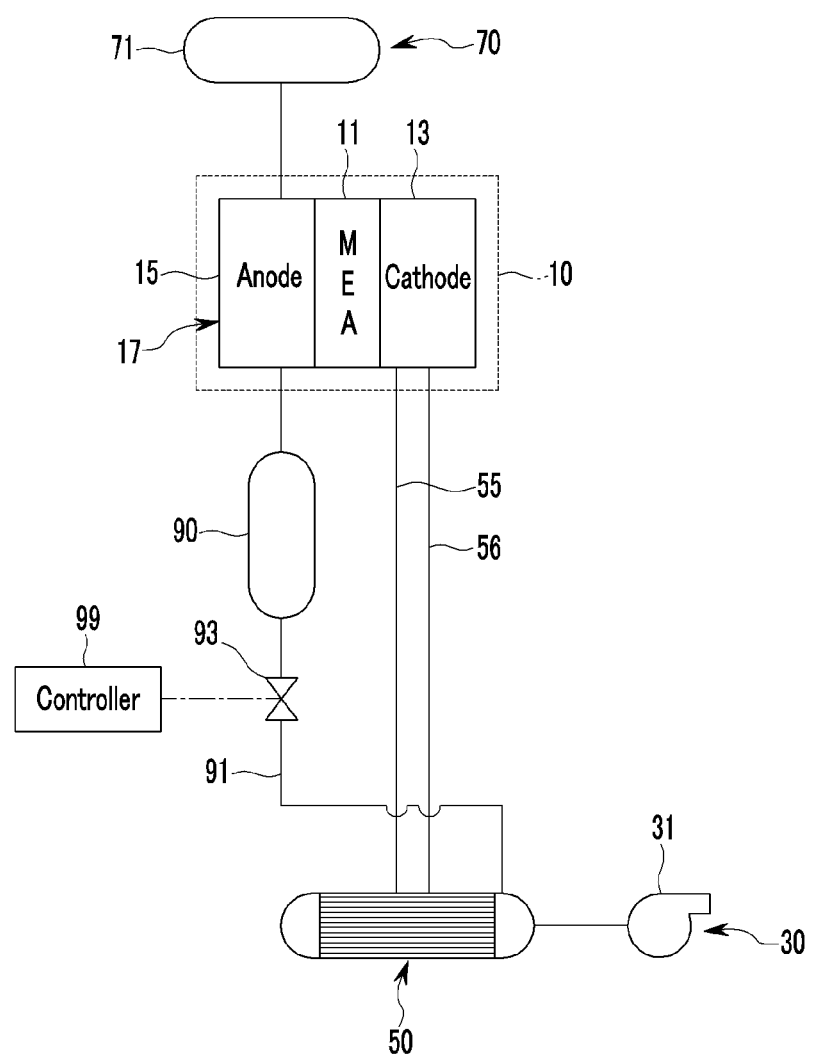
FIG. 1 is a block diagram schematically showing a fuel cell system according to an exemplary embodiment of the present invention.

10 . . . stack
13 . . . cathode
15 . . . anode
17 . . . fuel cell
30 . . . air supply unit
31 . . . blower
50 . . . humidifier
55 . . . exhaust air supply line
56 . . . humidification air supply line
70 . . . hydrogen supply unit
71 . . . hydrogen tank
90 . . . water trap
91 . . . condensate exhaust line
93 . . . drain valve
95 . . . injection portion
99 . . . controller

DETAILED DESCRIPTION OF THE EMBODIMENTS

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In order to clarify the present invention, parts that are not connected with the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

FIG. 1 is a block diagram schematically showing a fuel cell system according to an exemplary embodiment of the present invention. Referring to FIG. 1, a fuel cell system 100 according to an exemplary embodiment of the present invention includes a kind of an electrical generation system that generates electrical energy through an electrochemical reaction of a fuel (e.g., hydrogen) and an oxidizer (e.g., air).

The fuel cell system 100 of the present exemplary embodiment may include a stack 10, an air supply unit 30, a humidifier 50, a hydrogen supply unit 70, and a water trap 90, and these are explained as follows.

The stack 10 includes a cathode 13 having separators that are disposed at both side of a membrane-electrode assembly (11: MEA), and an electrical generation assembly of unit fuel cells 17 in which an anode 15 is disposed. The separators may be referred to as a "separating plate" or "bipolar plate" by those skilled in the art.

Here, when the system 100 is being normally operated, the cathode 13 of the fuel cell 17 is exhausting high temperature and humid air (hereinafter, this is called "exhaust air"). Further, the anode 15 of the fuel cell 17 is exhausting high temperature and humid hydrogen as non-reacted hydrogen, wherein the hydrogen is hereinafter called "exhaust hydrogen." As stated above, when the fuel cell 17 is outputting a large amount of power, the cathode 13 of the fuel cell 17 can in this case exhaust high temperature and dry air.

The air supply unit 30 is used to supply the cathode 13 of the fuel cell 17 with air. More specifically, the air supply unit 30 suck in atmospheric air (hereinafter, "supply air") into the system to be supplied to the fuel cell. For example the air supply system may include a blower 31 that can supply the cathode 13 of the fuel cell 17 with the supply air. However, the air supply unit 30 may be any type of air supply device which is capable of supplying air to the fuel cell at a certain pressure and rate and thus the exemplary embodiment of the present invention is not limited thereto.

The humidifier 50 in the illustrative embodiment of the present invention is configured to humidify the supply air that is supplied from the blower 31 with the exhaust air that is exhausted from the cathode 13 of the fuel cell 17 through a membrane, and the humidified air (hereinafter, "humidified air") is supplied to the cathode 13 by the humidifier 50.

The humidifier 50 may be disposed in a housing (not shown) to have a hollow pipe structure to be connected to the cathode 13 of the fuel cell 17 through an exhaust air supply line 55 and receives the supply air from the blower 31 through an inlet in the housing (not shown). The humidifier 50 may also be connected to the cathode 13 of the fuel cell 17 through a humidification air supply line 56. That is, the exhaust air that is exhausted from the cathode 13 of the fuel cell 17 may be supplied to the humidifier 50 through the exhaust air supply line 55, and the supply air of the blower 31 may be supplied to an inlet of the humidifier 50.

Also, the humidification air that is generated in the humidifier 50 may be supplied to the cathode 13 of the fuel cell 17 through the humidification air supply line 56, and the exhaust air of which the moisture is reduced in a membrane humidification process of the exhaust air and the supply air can be exhausted to atmosphere.

The hydrogen supply unit 70 may be configured to supply hydrogen gas to the anode 15 of the fuel cell 17, wherein the hydrogen gas is called "supply hydrogen." The hydrogen supply unit 70 stores hydrogen gas, and includes a hydrogen tank 71 that supplied the anode 15 of the fuel cell 17 with the hydrogen gas.

Finally, the water trap 90 is used to trap and exhaust the condensate that is generated from the anode 15 of the fuel cell 17.

The stack 10, the air supply unit 30, the humidifier 50, the hydrogen supply unit 70, and the water trap 90 are well understood by those persons skilled in the art, and therefore the detailed descriptions thereof will be omitted in this specification.

The fuel cell system 100 according to an exemplary embodiment of the present invention may have a structure that can purge the fuel cell 17 with hydrogen through the water trap 90 and the humidifier 50 when the system is started. That is, through the hydrogen purge of the fuel cell 17 while starting of the system 100 in an exemplary embodiment of the present invention, the oxygen inflow delay of the fuel cell 17 causes a condition in which the OCV (open circuit voltage) formation time is delayed and an OCV convergence value is decreased to reduce the catalyst degradation speed of the fuel cell 17 and to improve the durability of the stack 10.

Also, when the system is being normally operated, the fuel cell system 100 according to an exemplary embodiment of the present invention supplies an upstream side of the humidifier 50 with condensate through the water trap 90 to further improve the humidification performance of the fuel cell 17.

For this, the fuel cell system 100 according to an exemplary embodiment of the present invention connects an upstream side of the humidifier 50 with the water trap 90 through a condensate exhaust line 91. A drain valve 93 may be disposed on the condensate exhaust line 91, which is operated by a control signal that is transferred from a controller 99.

When the system 100 is started, the hydrogen gas that is supplied from the hydrogen supply unit 70 may be supplied to the anode 15 of the fuel cell 17, and the hydrogen gas that is exhausted from the anode 15 and is trapped in the water trap 90 when the drain valve 93 is opened can be supplied to an upstream side of the humidifier 50 through the condensate exhaust line 91 in an exemplary embodiment of the present invention.

Accordingly, when the system 100 is being started, the hydrogen gas that is supplied to the humidifier 50 is supplied to the cathode 13 of the fuel cell 17 through the humidification air supply line 56 to be able to purge the fuel cell 17 with hydrogen in an exemplary embodiment of the present invention. That is, when the system 100 is being started in an exemplary embodiment of the present invention, the hydrogen gas that is exhausted from the anode 15 is supplied to an upstream side of the humidifier 50 through the water trap 90 to purge the fuel cell 17 with hydrogen. The route that connects the water trap 90 with the humidifier 50 can be a hydrogen purge route of the fuel cell 17.

Meanwhile, when the system 100 is normally operated in an exemplary embodiment of the present invention, when the drain valve 93 is opened, the exhaust air that is exhausted from the cathode 13 of the fuel cell 17 is supplied to the humidifier 50 through the air supply line 55, the supply air that is supplied by the blower 31 is supplied to an upstream side of the humidifier 50, and the condensate that is trapped in the water trap 90 can be supplied to an upstream side of the humidifier 50 through the condensate exhaust line 91.

Accordingly, when the system 100 is normally operated in an exemplary embodiment of the present invention, the exhaust gas and the condensate are supplied to the humidifier 50, the supply air is humidified by the exhaust gas and the condensate in the humidifier 50, and the humidified air can be supplied to the cathode 13 of the fuel cell 17 through the humidification air supply line 56. That is, when the system 100 is being normally operated in an exemplary embodiment of the present invention, the condensate that is trapped in the water trap 90 is supplied to an upstream side of the humidifier 50, and the route that connects the water trap 90 with the humidifier 50 can be used as a humidification route of the fuel cell 17.

Figure 2:
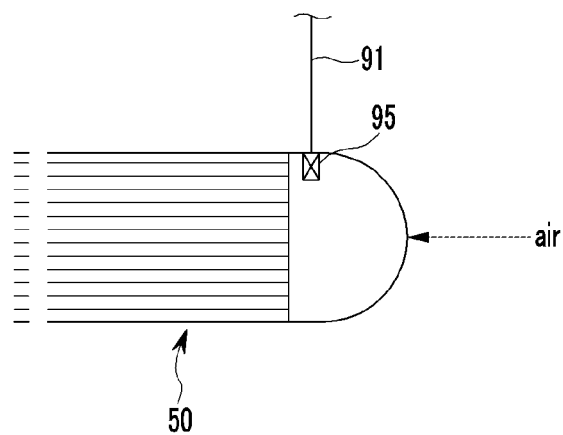
FIG. 2 is a drawing schematically showing a humidifier that is applied to a fuel cell system according to an exemplary embodiment of the present invention.

Here, the condensate that is supplied to the humidifier 50 through the condensate exhaust line 91 in an exemplary embodiment of the present invention can be injected on an upstream side of the humidifier 50. For this, as shown in FIG. 2, an exemplary embodiment of the present invention can include an injection portion 95 that is disposed at an end portion of the condensate exhaust line 91 to be able to inject the condensate.

As an alternative method, it is not limited to a condition that the injection portion 95 is disposed on the condensate exhaust line 91 in an exemplary embodiment of the present invention, and the condensate that is exhausted through the condensate exhaust line 91 can be injected at an upstream side of the humidifier 50 by the pressure of the supply air that is supplied from the blower 31.

Figure 3:
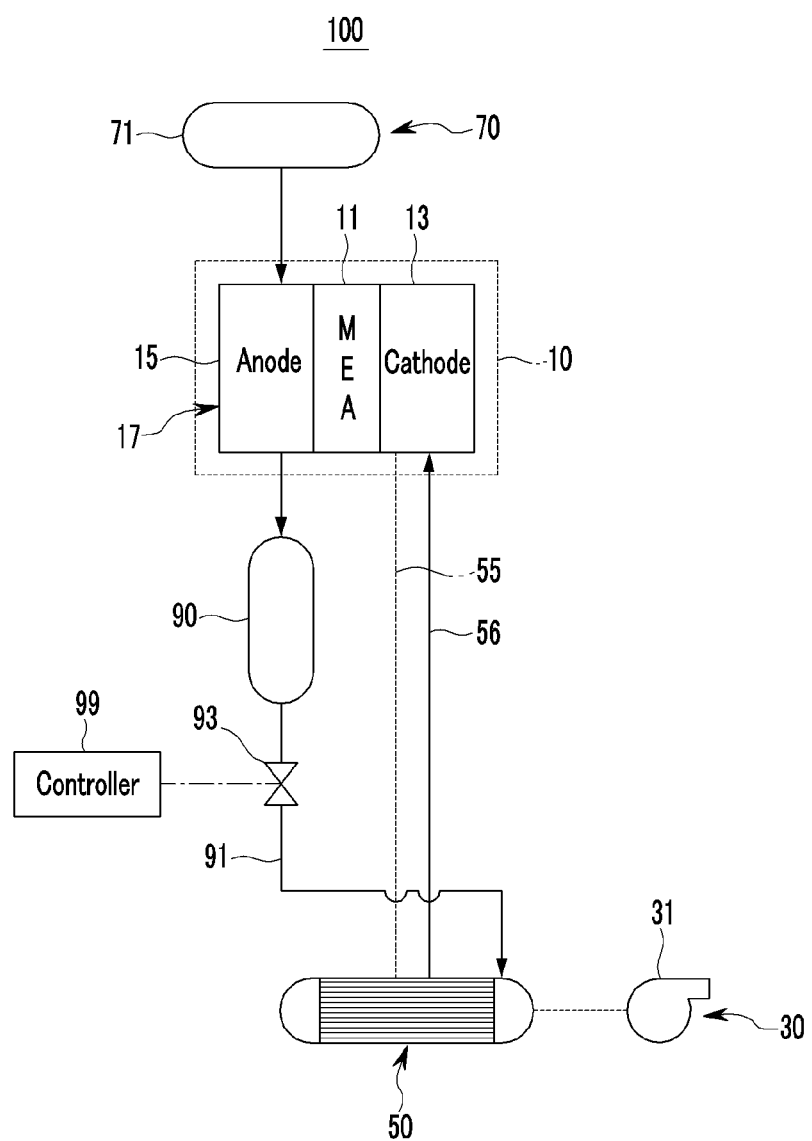
FIG. 3 and FIG. 4 are drawings for explaining a driving method of a fuel cell system according to an exemplary embodiment of the present invention.
Figure 4:
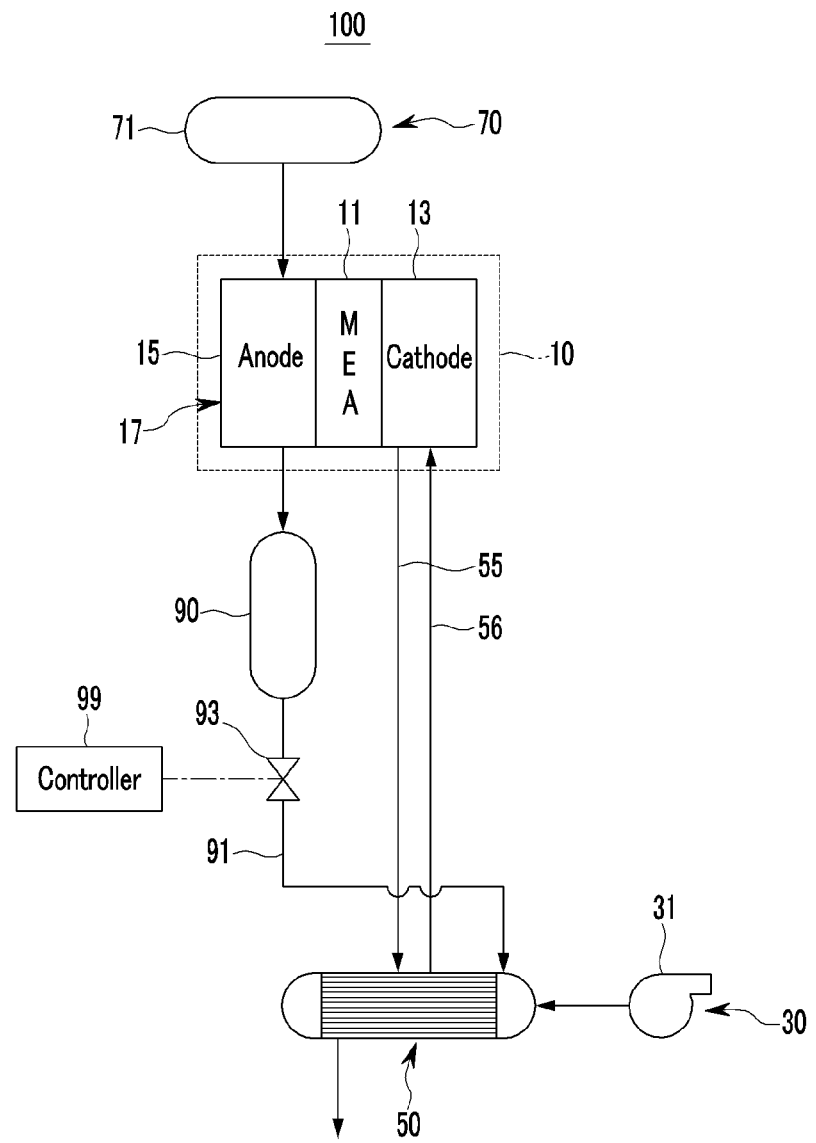

Hereinafter, the driving method of the fuel cell system 100 according to an exemplary embodiment of the present invention as described above will be explained with reference to the accompanying drawings. FIG. 3 and FIG. 4 are drawings for explaining a driving method of a fuel cell system according to an exemplary embodiment of the present invention.

Referring to FIG. 3, firstly, when the system 100 initiates or starts in the exemplary embodiment of the present invention, an electrical signal is transferred to the drain valve 93 to open the condensate exhaust line 91, and the blower 31 that is a part of the air supply unit 30 is turned off. When this occurs, the hydrogen gas from the hydrogen supply unit 70 is supplied to the anode 15 of the fuel cell 17 in an exemplary embodiment of the present invention.

Then, the hydrogen gas is exhausted from the anode 15 to be trapped in the water trap 90. Subsequently, the hydrogen gas that is trapped in the water trap 90 can be supplied to an upstream side of the humidifier 50 through the condensate exhaust line 91 in an exemplary embodiment of the present invention, and the hydrogen gas can be supplied from the humidifier 50 to the cathode 13 of the fuel cell 17 through the humidification air supply line 56. Accordingly, when the system 100 is started in an exemplary embodiment of the present invention, the hydrogen gas is supplied to an upstream side of the humidifier 50 through the water trap 90 to purge the fuel cell 17 with hydrogen.

Meanwhile, referring to FIG. 4, when the system 100 is being normally operated in an exemplary embodiment of the present invention, air is supplied to the cathode 13 of the fuel cell 17 through the air supply unit 30, and hydrogen gas is supplied to the anode 15 of the fuel cell 17 through the hydrogen supply unit 70. Then, electrical energy is generated in the stack 10 through an electrochemical reaction via the hydrogen gas and the supply air, the cathode 13 exhausts high temperature and humid air (exhaust gas), and the anode 15 exhausts hydrogen and condensate in the process. Here, the condensate that is exhausted from the anode 15 can be trapped in the water trap 90. In this case, the drain valve 93 of the condensate exhaust line 91 is opened by the controller 99.

When this occurs, the exhaust air that is exhausted from the cathode 13 is supplied to the humidifier 50 through the exhaust air supply line 55, and the supply air is supplied from the blower 31 to an upstream side of the humidifier 50 in an exemplary embodiment of the present invention. Further, the condensate that is trapped in the water trap 90 is supplied to an upstream side of the humidifier 50 through the condensate exhaust line 91.

In this case, the condensate can be injected at an upstream side of the humidifier 50 by the injection portion 95 that is disposed at an end portion of the condensate exhaust line 91, and the supply air that is supplied from the blower 31 can be injected by pressure of the supply air. Then, the condensate is sprayed to be uniformly mixed with the supply air at an upstream side of the humidifier 50 to be supplied to the humidifier 50. Accordingly, the supply air is humidified by the condensate and the exhaust gas through a membrane humidification process of the humidifier 50, and the humidifier 50 supplies the fuel cell 17 with the humidified air through the humidification air supply line 56.

As described above, when the system 100 is started in an exemplary embodiment of the present invention, the route that connects the water trap 90 with the humidifier 50 can be used to purge the fuel cell 17 with hydrogen without the need for a separate purging system. Furthermore, when the system 100 is being normally operated in an exemplary embodiment of the present invention, the route that connects the water trap 90 with the humidifier 50 may be used to supply an upstream side of the humidifier 50 with condensate that is trapped in the water trap 90 so that the fuel cell 17 is humidified.

Accordingly, when the system 100 is started in an exemplary embodiment of the present invention, the fuel cell 17 is purged by hydrogen through a route that connects the water trap 90 with the humidifier 50 so that OCV (open circuit voltage) formation time is delayed and OCV convergence value is reduced according to an oxygen inflow delay of the fuel cell 17. Thereby, the catalyst degradation speed of the fuel cell 17 is reduced in an exemplary embodiment of the present invention and the durability of the stack 10 can be increased.

Also, when the system 100 is normally operated in an exemplary embodiment of the present invention, the condensate that is trapped in the water trap 90 is supplied to an upstream side of the humidifier 50 through a route connecting the water trap 90 with the humidifier 50 to humidify the fuel cell 17 so that the humidification performance of the fuel cell 17 can be increased.

Further, when the system 100 is started in an exemplary embodiment of the present invention, it is not necessary to have a separate structure for purging the fuel cell 17 with hydrogen, a humidification route for connecting the water trap 90 with the humidifier 50 may be used to purge the fuel cell 17 with hydrogen, and therefore the entire system 100 can be simplified (i.e., by removing the need for a separate purging system).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A driving method of a fuel cell system having a stack that includes an electrical generation assembly of fuel cells, an air supply unit configured to supply a cathode of a fuel cell with fresh air, a humidifier configured to humidify exhaust air exhausted from the cathode and the fresh air supplied by the air supply unit, a hydrogen supply unit configured to supply an anode of the fuel cell with hydrogen, and a water trap configured to trap condensate that is generated in the anode and exhaust the condensate to an upstream side of the humidifier, the method comprising, in a starting mode:
   opening, by a controller, a drain valve of a condensate exhaust line that connects the water trap with the humidifier;
   supplying the anode with hydrogen from the hydrogen supply unit;
   directly supplying the humidifier with hydrogen that is exhausted from the anode through the water trap without passing through the air supply unit; and
   supplying the cathode with hydrogen through the humidifier to purge the fuel cell with hydrogen,
   wherein the air supply unit is turned off, such that the fresh air is not supplied to the cathode, and a mixture of the hydrogen supplied from the water trap to the humidifier and air in the humidifier is purged to the cathode.

2. The driving method of a fuel cell system of claim 1, wherein hydrogen is supplied to an upstream side of the humidifier through the condensate exhaust line.

3. The driving method of a fuel cell system of claim 1, wherein after the starting mode is completed, the air supply unit is operated when the drain valve is opened, the fresh air supplied by the air supply unit is supplied to an upstream side of the humidifier, and
   the condensate trapped in the water trap is supplied to an upstream side of the humidifier through the condensate exhaust line.

4. The driving method of a fuel cell system of claim 3, wherein the humidifier humidifies the exhaust air and the fresh air, and the humidified air is supplied to the cathode of the fuel cell.

* * * * *